US009916645B2

(12) United States Patent
Thoma et al.

(10) Patent No.: US 9,916,645 B2
(45) Date of Patent: Mar. 13, 2018

(54) CHROMA SUBSAMPLING

(71) Applicant: Fraunhofer-Gesellschaft zur Foerderung der angewandten Forschung e.V., Munich (DE)

(72) Inventors: Herbert Thoma, Erlangen (DE); Christian Scherl, Uttenreuth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 205 days.

(21) Appl. No.: 14/941,056

(22) Filed: Nov. 13, 2015

(65) Prior Publication Data

US 2016/0071251 A1    Mar. 10, 2016

Related U.S. Application Data

(63) Continuation of application No. PCT/EP2014/059382, filed on May 7, 2014.

(30) Foreign Application Priority Data

May 14, 2013    (EP) ..................................... 13167639

(51) Int. Cl.
*G06K 9/00*   (2006.01)
*G06T 5/00*   (2006.01)
(Continued)

(52) U.S. Cl.
CPC ................ *G06T 5/007* (2013.01); *G06T 5/40* (2013.01); *G06T 5/50* (2013.01); *G06T 7/11* (2017.01);
(Continued)

(58) Field of Classification Search
CPC ... G06T 5/007; G06T 7/11; G06T 5/40; G06T 5/50; G06T 2207/10024;
(Continued)

(56) References Cited

U.S. PATENT DOCUMENTS 5,477,345 A * 12/1995 Tse .......................... H04N 1/486
                                                      348/272
5,742,704 A    4/1998 Koshi et al.
(Continued)

FOREIGN PATENT DOCUMENTS

JP    H04178094 A    6/1992
JP    H06319133 A    11/1994
(Continued)

OTHER PUBLICATIONS

Wong, Alexander, and William Bishop. "Practical content-adaptive subsampling for image and video compression." Multimedia, 2006. ISM'06. Eighth IEEE International Symposium on. IEEE, 2006.*
(Continued)

*Primary Examiner* — Jonathan S Lee
(74) *Attorney, Agent, or Firm* — Michael A. Glenn; Perkins Coie LLP (57) ABSTRACT

A chroma subsampling having reduced artifacts is achieved by detecting high contrast areas in a luminance channel of an image to be chroma subsampled so as to partition the image into a first region composed of the high contrast areas and a second region distinct from the first region, with chroma subsampling the image in the first region using a first chroma subsampler and chroma subsampling the image in the second region using a second chroma subsampler, with the first chroma subsampler having a higher edge preserving property than compared to the second chroma subsampler. Thereby, bleeding artifacts may be avoided at least partially, while the saturation of the image may be substantially preserved.

12 Claims, 7 Drawing Sheets

(51) Int. Cl.
H04N 9/64 (2006.01)
H04N 19/98 (2014.01)
G06T 5/40 (2006.01)
G06T 5/50 (2006.01)
G06T 7/11 (2017.01)

(52) U.S. Cl.
CPC ............. H04N 9/646 (2013.01); H04N 19/98 (2014.11); *G06T 2207/10024* (2013.01); *G06T 2207/20024* (2013.01); *G06T 2207/20208* (2013.01)

(58) Field of Classification Search
CPC ........... G06T 2207/20024; G06T 2207/20208; H04N 19/98; H04N 9/646
See application file for complete search history.

(56) References Cited

U.S. PATENT DOCUMENTS

| | | | |
|---|---|---|---|
| 7,003,160 B2 | 2/2006 | Horie et al. | |
| 7,084,906 B2* | 8/2006 | Adams, Jr. | H04N 1/58 348/222.1 |
| 2002/0025080 A1 | 2/2002 | Horie | |
| 2003/0222998 A1 | 12/2003 | Yamauchi et al. | |
| 2006/0104508 A1 | 5/2006 | Daly et al. | |
| 2009/0278961 A1 | 11/2009 | Mohanty et al. | |
| 2011/0052053 A1* | 3/2011 | Tomaselli | H04N 1/58 382/167 |
| 2013/0064448 A1* | 3/2013 | Tomaselli | G06T 5/002 382/167 |
| 2013/0322753 A1* | 12/2013 | Lim | G06T 5/001 382/167 |
| 2016/0269733 A1* | 9/2016 | Tourapis | H04N 9/64 |

FOREIGN PATENT DOCUMENTS

| | | |
|---|---|---|
| JP | 2002077625 A | 3/2002 |
| JP | 2002232293 A | 8/2002 |
| JP | 2004535126 A | 11/2004 |
| JP | 2006058253 A | 3/2006 |
| JP | 2011166547 A | 8/2011 |
| RU | 2011138056 A | 3/2013 |
| WO | 03007126 A2 | 1/2003 |
| WO | 2010104624 A2 | 9/2010 |
| WO | 2011088960 A1 | 7/2011 |
| WO | 2012142506 A1 | 10/2012 |

OTHER PUBLICATIONS

Murching, Anil M., and John W. Woods. "Adaptive subsampling of color images." Image Processing, 1994. Proceedings. ICIP—94., IEEE International Conference. vol. 3. IEEE, 1994.*
Sullivan, Gary, "Color Format Down-Conversion for Test Sequence Generation", Dec. 2003, pp. 1-10.
Sullivan, Gary, "Color Format Up-Conversion for Video Display", Dec. 2003, pp. 1-6.
Wikipedia, "JPEG", Retrieved from the Internet: URL:http://en.wikipedia.org/w/index.php?title=JPEG&oldid=554886142[retrieved on Nov. 1, 2013], May 13, 2013, 20 pages.

* cited by examiner

Y'CbCr 4:4:4

FIG 1A

Y'CbCr 4:2:2

FIG 1B

Y'CbCr 4:2:0

FIG 1C

Y'CbCr 4:2:0

CHROMA SUBSAMPLING

CROSS-REFERENCE TO RELATED APPLICATIONS

This application is a continuation of copending International Application No. PCT/EP2014/059382, filed May 7, 2014, which claims priority from European Application No. EP 13167639.7, filed May 14, 2013, which are each incorporated herein in its entirety by this reference thereto.

The present application is concerned with chroma subsampling such as a chroma subsampling of HDR images.

BACKGROUND OF THE INVENTION

Traditional low dynamic range (LDR) image and video coding schemes utilize color spaces like YCbCr with one luminance and two chrominance channels and subsampling of the chrominance channels to exploit the fact that the human eye is less sensitive to chroma variations than to luminance variations.

For high dynamic range (HDR) video an adaptive LogLuv color space has been proposed in [1]. Here it is possible to subsample the u and v chrominance channels as well.

However, especially in HDR images and video, edges with every high contrast may occur, i.e. areas with very high luminance next to areas with very low luminance. At such edges, artifacts due to the chroma subsampling can become visible.

Figure 6:
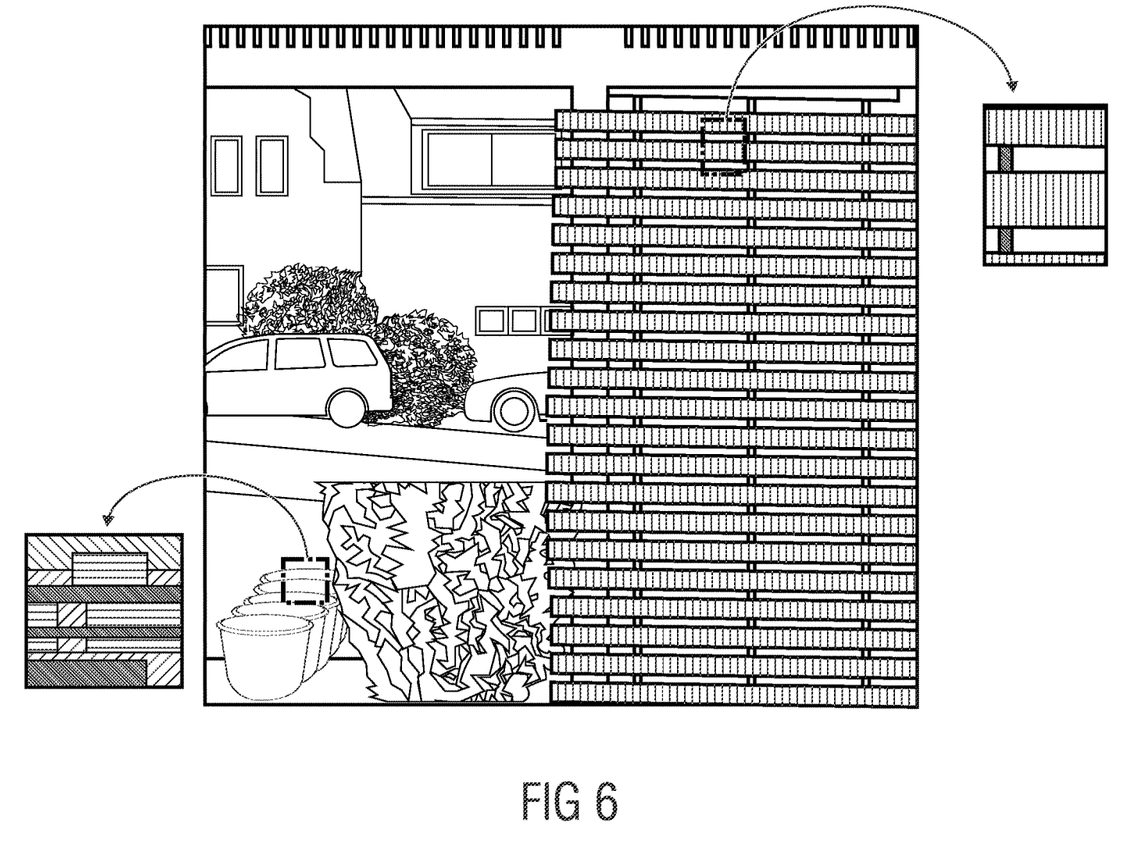
FIG. 6 an image and enlarged subportions thereof, as obtained by chroma downsampling and re-chroma-upsampling using methods as described in [2] and [3].

FIG. A shows a tone map HDR image after a chroma subsampling with filters according to [2] and upsampling with filters according to [3]. Color bleeding artifacts are clearly visible at portions highlighted with a rectangle and indicated in an enlarged manner beside the image, namely at the rim of the flower pot and between the blades of the blind. These artifacts basically occur because chroma values from dark and bright regions get mixed-up during the process of chroma subsampling and upsampling.

SUMMARY

According to an embodiment, an apparatus for chroma subsampling may have: a detector configured to detect high contrast areas in a luminance channel of an image to be chroma subsampled so as to partition the image into a first region composed of the high contrast areas and a second region distinct from the first region; a first chroma subsampler configured to chroma subsample the image in the first region; a second chroma subsampler configured to chroma subsample the image in the second region, wherein the first chroma subsampler exhibits a higher edge preserving property than compared to the second chroma subsampler.

According to another embodiment, a method for chroma subsampling may have the steps of: detecting high contrast areas in a luminance channel of a image to be chroma subsampled so as to partition the image into a first region composed of the high contrast areas and a second region distinct from the first region; chroma subsample the image in the first region using a first chroma subsampler; chroma subsample the image in the second region a second chroma subsampler, wherein the first chroma subsampler exhibits a higher edge preserving property than compared to the second chroma subsampler.

According to another embodiment, a computer program may have a program code for performing, when running on a computer, a method according to claim 11.

It is a basic idea of the present invention that a chroma subsampling having reduced artifacts may be achieved by detecting high contrast areas in a luminance channel of an image to be chroma subsampled so as to partition the image into a first region composed of the high contrast areas and a second region distinct from the first region, with chroma subsampling the image in the first region using a first chroma subsampler and chroma subsampling the image in the second region using a second chroma subsampler, with the first chroma subsampler having a higher edge preserving property than compared to the second chroma subsampler. Thereby, bleeding artifacts may be avoided at least partially, while other characteristics of the image such as the saturation of the image, as otherwise influenced by using rank filters globally, for example, may be substantially preserved.

BRIEF DESCRIPTION OF THE DRAWINGS

Embodiments of the present invention will be detailed subsequently referring to the appended drawings, in which.

DETAILED DESCRIPTION OF THE INVENTION

Before describing some embodiments of the present application, the nature of chroma subsampling is described with respect to FIGS. 1a to 1d. Each of these figures shows a spatial subportion out of an image or picture, and the luma and chroma samples contained therein. In particular, luma samples are shown as white circles, whereas chroma samples are indicated as hatched circles with different hatchings being used for the two different chroma components.

Each "sample" has associated therewith a certain spatial sampled position and a sample value. Merely the samples' sample positions are indicated in FIGS. 1a to 1d. The values of the samples may be represented differently for luma samples on the one hand and chroma samples on the other hand. Alternatively, the same representation may be used. In HDR images, the dynamic range presented by the representation of the luma samples often exceeds the representable dynamic range of the chroma samples. Luma samples may, for example, be represented using a floating point representation. In another example, which is denoted below as logLuv representation, the luma samples are represented by integer values which, however, measure the luminance in a logarithmic scale, whereas the chroma samples represent their chroma values using integer values at a linear scale, for example.

Figure 1A:
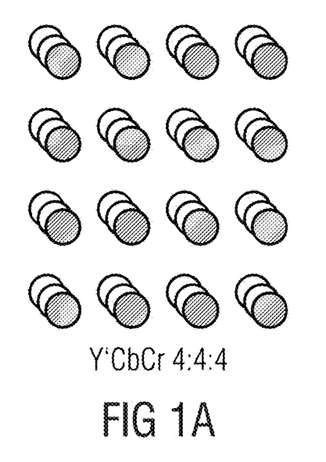
FIGS. 1a-1d show schematics of different chroma sample patterns.
Figure 1B:
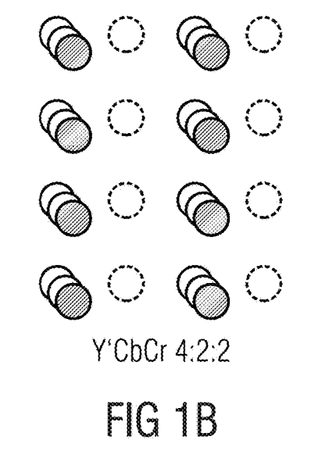

In the example of FIG. 1a, the number of luma samples within the spatial subportion shown is equal to the number of chroma samples of the first chroma component, and the number of samples of the second chroma component. As exemplarily shown, their sample positions are co-located to each other. Such a color representation is, for example, known as 4:4:4. In FIG. 1b, the ratio between luminance samples is, however, twice the number of chroma samples of the first and second chroma components, respectively. That is, the spatial resolution of the two chroma channels of the picture is, in case of FIG. 1b, half the spatial resolution of the luma channel. In case of FIG. 1b, the chroma samples are co-located to the luma samples of every second column of luma samples, i.e. the spatial resolution of the chroma channels is halved along the horizontal direction and is equal to the spatial resolution of the luma channel along the vertical direction. However, this could also be designed differently. In any case, the chroma sampling pattern shown in FIG. 1b is known as 4:2:2.

Figure 1C:
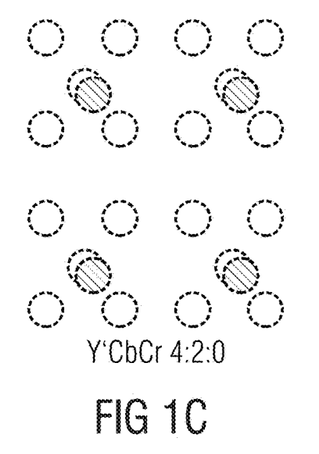
Figure 1D:
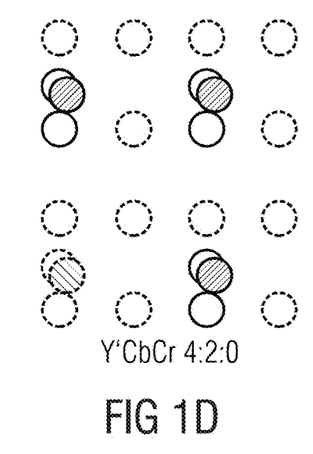

FIGS. 1c and 1d show two possible configurations where the number of chroma samples of the first and second chroma channels, respectively, is a quarter of the number of luma samples within the respective spatial subportion of the image. In case of FIG. 1c, for example, one chroma sample per chroma channel is positioned in the middle of a block of 2×2 luma samples. The luma samples are regularly arranged in rows and columns in any of chroma sampling patterns of FIGS. 1a to 1d and the 2×2 blocks are, accordingly, too. In the case of FIG. 1d, the chroma sample positions are shifted along the horizontal or row direction at a half pel distance, i.e. at half the pitch of the luma samples, compared the pattern of FIG. 1c so as to be positioned in the mid of consecutive pairs of luma samples in every second column of luma samples. Both chroma sampling patterns of FIGS. 1c and 1d are known as 4:2:0.

The operations which lead from the chroma sampling pattern according to FIG. 1a to any of the chroma sampling patterns of color 1b to 1d is called "chroma subsampling" and although the embodiments outlined in more detail below exemplarily assume that the color representation according to FIG. 1a forms the origin or starting point of the chroma subsampling, this is naturally not mandatory. The chroma sampling pattern of the picture to be chroma subsampled may, alternatively to the following description, be different to the one shown in FIG. 1a. Similarly, the specific chroma sampling pattern resulting from the color subsampling may be different to those shown in FIGS. 1b and 1d, and merely for the sake of an easier understanding, the following description sometimes illustratively refers to the color representations of FIGS. 1b and 1c as the target of the chroma subsampling procedure. For example, chroma subsampling leading from color representation of FIG. 1a to the color representations of FIG. 1c on the one hand and FIG. 1d on the other hand merely differ from each other by the chroma sample positions rather than the number of chroma samples where the chroma subsampling has to take place. To account for this difference, chroma subsampling filters with different filter coefficients may be used.

In order to overcome the problems outlined above in the introductory portion of the specification of the present application, i.e. the color bleeding artifacts associated with the usually used chroma subsampling processes, the inventors of the present application had the following idea. In particular, color bleeding artifacts may be avoided if only chroma values from the bright areas, for example, are used for the subsampling process. For example, an easy way to realize this would be to find the position of the highest luminance value in a 2×2 pixel area for 4:2:0, or in a 2×1 pixel area for 4:2:2, and use the chrominance values from the co-located positions of the respective pixel areas as subsampled chrominance values for this 2×2, or 2×1, pixel area. However, if this would be done globally for the whole image/picture, another artifact occurs: the overall color of the image gets de-saturated. Thus, two methods for chroma subsampling are used in accordance with the embodiments outlined below: a chroma subsampling method that avoids the color bleeding artifact, and another chroma subsampling method that avoids the de-saturation artifact. A method that avoids the de-saturation would be, for example, a down-conversion filter according to [2] or a simple arithmetic mean of four chroma values of a 2×2 pixel area for 4:2:0, for example. Accordingly, the embodiments outlined further below use a determination as to where which of the two chroma subsampling methods should be applied. For example, a simple method for this decision is, as further outlined below, to find the highest and the lowest luminance value in a 2×2 (in case of 4:2:0) or 2×1 (in case of 4:2:2) pixel area. If the ratio between the highest and the lowest value exceeds a threshold, the color bleeding avoiding method is applied, otherwise the de-saturation avoiding chroma subsampling method is applied. Experimentally, a threshold of a ratio of two has been found to give good results, but naturally this is just an example and may depend on the circumstance and may be varied accordingly.

Figure 2:
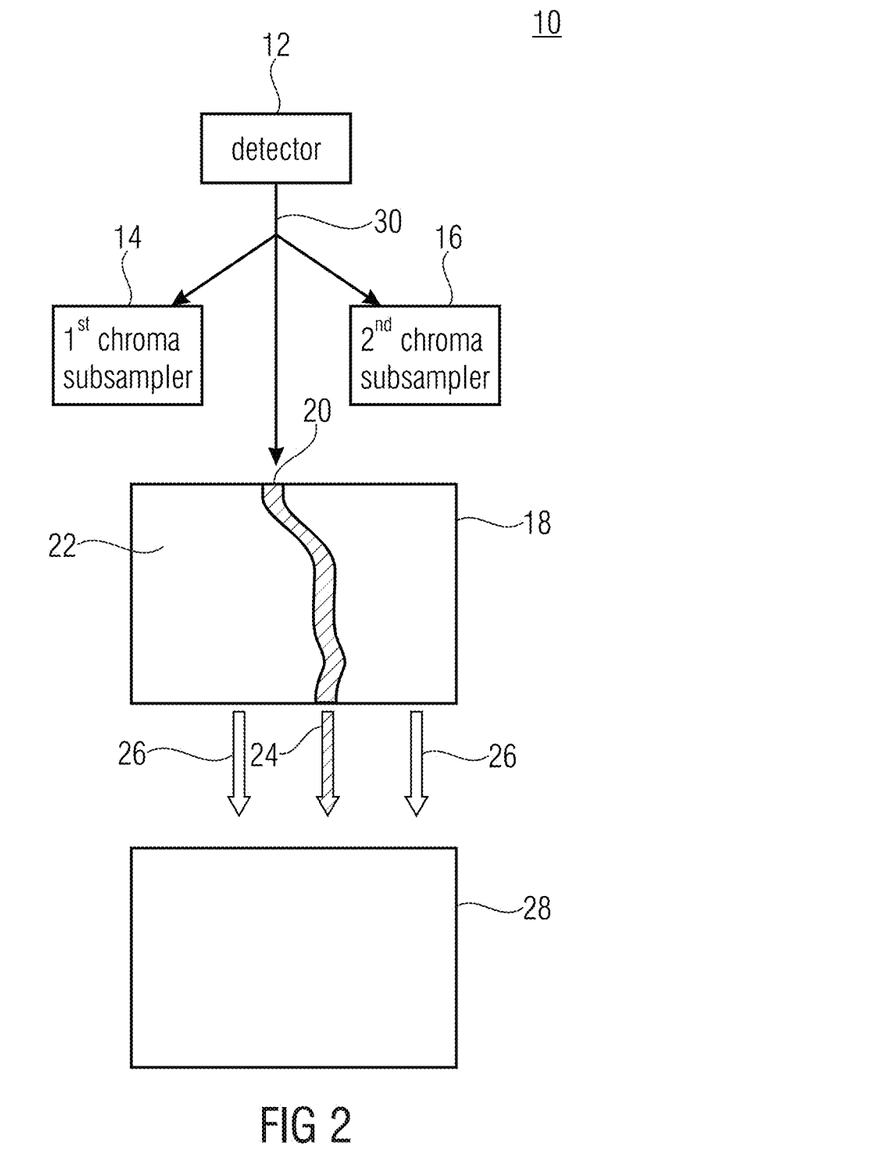
FIG. 2 shows a schematic block diagram of an apparatus for chroma subsampling in accordance with an embodiment.

FIG. 2 shows an apparatus for chroma subsampling which forms a result of the thoughts just-outlined. The apparatus is generally indicated using reference sign 10 and comprises a detector 12, a first chroma subsampler 14 and a second chroma subsampler 16. The detector detects high contrast areas in a luminance channel of an image 18 to be chroma subsampled so as to partition the image into a first region 20 composed of the high contrast areas, and a second region 22 distinct from the first region 20. The first chroma subsampler 14 is configured to chroma subsample the image 18 in the first region 20, i.e. the first chroma subsampler 14 restricts the performance of its chroma subsampling to the first region 20, and accordingly, the second chroma subsampler 16 is configured to chroma subsample the picture only within the second region 22. As a result of the chroma subsampling 24 performed by the first chroma subsampler 14, and the chroma subsampling 26 performed by the second chroma subsampler 16, a chroma subsampled image 28 results from image 18. As far as the luma channel of image 28 is concerned same may, for example, be the same as the original image 18. Merely the chroma resolution of one, or both of the chroma channels of image 28 may have been subsampled from image 18 to image 28. Theoretically, it could be that merely one chroma channel is present, although the usual case is that two chroma channels are present.

The first chroma subsampler 14 and second chroma subsampler 16 differ from each other in that the first chroma subsampler has a higher edge preserving property than compared to the second chroma subsampler 16. For example, the first chroma subsampler could be configured to perform the chroma subsampling using a rank filter and the second chroma subsampler could be configured to perform the chroma subsampling using an average filter such as a mean average filter. In accordance with the embodiments outlined below, the second chroma subsampler 16 performs its subsampling 26 using the chroma channels of image 18 only, i.e. irrespective of, and independent from, the luminance channel of image 18. The first chroma subsampler 14, however, may use a rank filter for chroma subsampling 24, which yields its ranking of the chroma samples in the original image 18 by evaluating the luminance channel of image 18. For example, the first chroma subsampler 14 kernel-wise selects a chroma sample value of the picture to be chroma subsampled, being co-located to a maximum or minimum luminance sample value of the image 18 to be chroma subsampled.

Next, specific embodiments or implementations are presented. They illustrate possible implementations of the detector, the first chroma subsampler 14 and the second chroma subsampler 16 but it is noted that all of these implementation details could be applied onto detector 12, chroma subsampler 14 and chroma subsampler 16, individually, without sticking to the combinations as they occur in the figures.

Figure 3A:
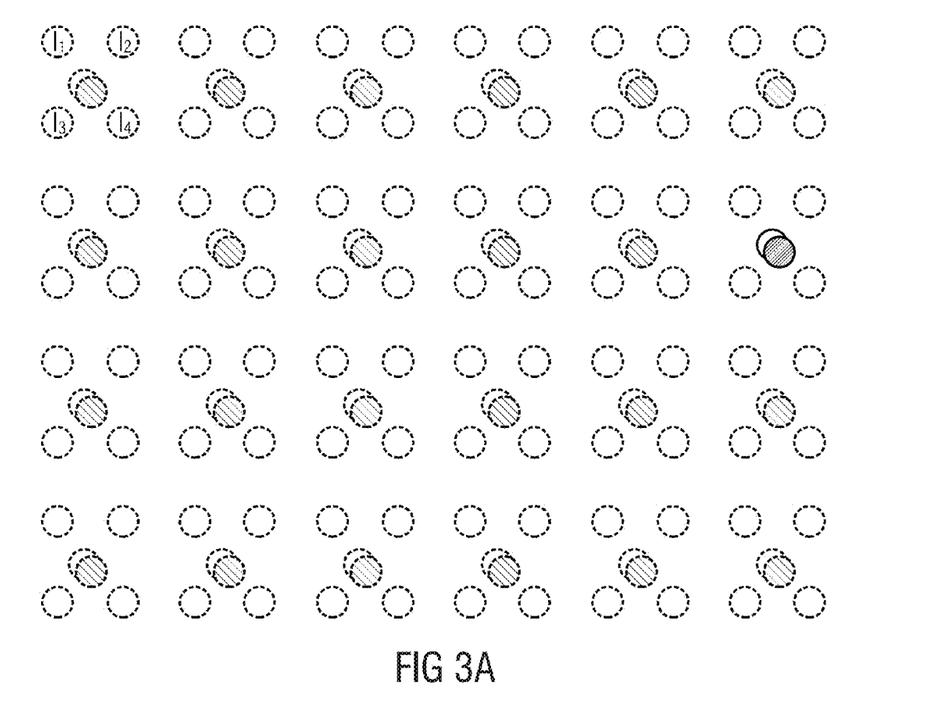
FIG. 3a-3b show a portion of an image to be chroma subsampled along with the target positions of the chroma samples of the chroma subsampled image and the positional areas at which high contrast detection is exemplarily performed, one time for chroma subsampling down to the color sample pattern of FIG. 1c in case of FIG. 3a and the other time for the chroma subsampling down to the color sample pattern of FIG. 1b in case of FIG. 3b.
Figure 3B:
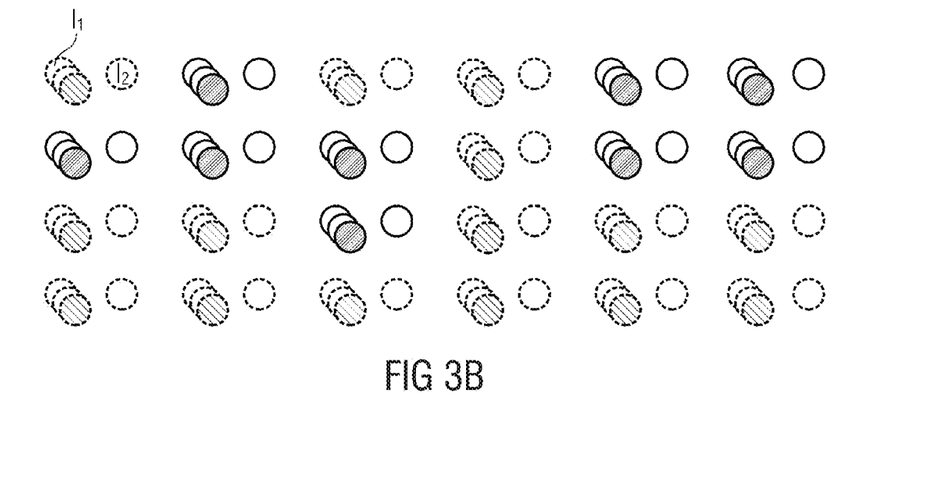

With regard to FIGS. 3a and 3b, it is exemplarily outlined how detector 12 could perform the high contrast area detection 30 (see FIG. 2) which detection, in turn, steers the location of operation of chroma subsamplers 14 and 16. FIGS. 3a and 3b show the positions of the luma samples of the original image 18 with white circles. As they remain the same in the resulting image, these white circles may concurrently indicate the luma sample positions within the final image 28. Further, differently hatched circles show the positions of chroma samples within the resulting chroma subsampled image 28, where FIG. 3a assumes that the chroma subsampling takes place from the chroma sampling pattern according to FIG. 1a to the chroma sampling pattern of FIG. 1c, whereas FIG. 3b addresses the case of transitioning from chroma sampling pattern of FIG. 1a to chroma sampling pattern according to FIG. 1b. Since the same style of presentation is also used in FIGS. 4a to 5b, it should be noted that FIGS. 3a and 3b not only show, by means of the white circles, the luma sample positions, but concurrently the positions of the original chroma samples which are, as described with respect to FIG. 1a, co-located to the original luma samples' positions. The explanations just made are, thus, also valid for the following figures.

In accordance with the embodiments of FIGS. 3a and 3b, the detector 12 detects the high contrast areas by locally checking whether a ratio between lowest and highest luminance within a first local template exceeds a predetermined threshold. Detector 12 performs this check in at a certain granularity, here exemplarily at a granularity of 2×2 blocks in case of FIG. 3a and at a granularity of 2×1 blocks in case of FIG. 3b. In accordance with the example shown in FIGS. 3a and 3b, the detector 12 uses a 2×2 luminance sample template and 2×1 luminance sample template, respectively, i.e. a template encompassing a 2×2 luma sample area within the original image 18 in the case of FIG. 3a and a 2×1 luma sample area within the original image 18 in the case of FIG. 3b, so as to determine for each area co-located to the respective template as to whether the luminance image content therein has high contrast, i.e. is a high contrast area, or not. However, this may also be handled differently. By use of continuous lines, FIGS. 3a and 3b show the positions of the local template, at which the detector 12 performs the local check whether a ratio between lowest and highest luminance within image 18 exceeds the predetermined threshold, here exemplarily coinciding with the positional areas at/for which the detector 12 performs the detection. As shown therein, the detector positions the local template gap-lessly and without overlap, distributed over the image 18, thereby defining a template grid of 2×2 grid areas in case of FIG. 3a and 2×1 areas in case of FIG. 3b which grid is, in FIGS. 3a and 3b, visible by the continuous lines. As outlined with respect to FIGS. 4a and 4b, the first and second chroma subsamplers 14 and 16 may be configured to perform the chroma subsampling 24 and 26, respectively, such that the chroma subsampling results in a subsampling resolution coinciding with the resolution of the template grid, i.e. in exactly one chroma sample per local template position or grid area, per chroma channel.

For one exemplary local template position, FIGS. 3a and 3b denote the luma samples within the local template by $l_1$ to $l_4$ in the case of FIG. 3a and $l_1$ and $l_2$ in the case of FIG. 3b. As already explained above, the detector 12 may, for each local template position, check whether the ratio between maximum luminance and minimum luminance within the current local template position exceeds a certain threshold. Let $l_i$ denote the luminance values, then the detector 12 may check for each local template position whether $$\max\left(\left\{\forall\, i \neq j \text{ with } l_i < l_j : \frac{l_j}{l_i}\right\}\right) > t$$

wherein i, j are within 1 . . . 4 in the case of FIG. 3a and 1 . . . 2 in the case of FIG. 3b, and t is the threshold. As just mentioned, the threshold may, for example, be 2. If the logLuv color space is used, the luminance value is, as already outlined above, a logarithmic representation of the luminance value of a pixel, and accordingly a ratio between the highest and lowest luminance value, corresponds to a difference of the respective luminance values. Thus, in case of using the logLuv color space, the detector 12 may determine the ratio between lowest and highest luminance within the local template by subtraction. The detector 12 may then check whether $$\max(\{\forall i \neq j \text{ with } i<j : |l_i - l_j|\}) > t.$$

If the check reveals that the threshold is exceeded, the detector 12 attributes the area covered by the current local template position to the high contrast areas, i.e. to region 20, whereas if not the area covered by the current local template position is attributed to the remaining region 22. High contrast areas are, in FIGS. 3a and 3b, indicated by hatching for illustration purposes.

It should be noted that there are several modifications possible with respect to the description brought forward so far. For example, the high contrast area detection may be performed in a more complex manner. For example, the detector 12 may perform the high contrast area check at a pitch which, for example, is lower than the local templates width, i.e. the pitch at which the local template is positioned in order to cover image 18 and locally sample the contrast of image 18, may be lower than the local template's width, so that the templates overlap each other at the positions distributed over image 18 at the detection pitch. For example, detector 12 could perform the high contrast check for each of the 2×2 areas shown in FIGS. 3a and 3b, thus forming the positional areas at which the high contrast detection is performed, but use a template which exceeds each of these areas, such as a 4×4 area or 4×1 area for each detection, i.e. each positional area. Moreover, the high contrast area detection could be designed more complicatedly than merely determining the min/max luminance ratio exceeding a certain threshold. For example, detector 12 could examine a histogram of luminance values within the local template so as to determine whether or not the histogram is bi-modal or not, and if yes whether the two modes of the bi-modal distribution are separated from each other by more than a predetermined threshold such as, as outlined above, 2. Even a sort of edge detection within the local template could be used in order to locate the high contrast areas. The result of this detection would be attributed to the positional area at which the local template is currently positioned.

Figure 4A:
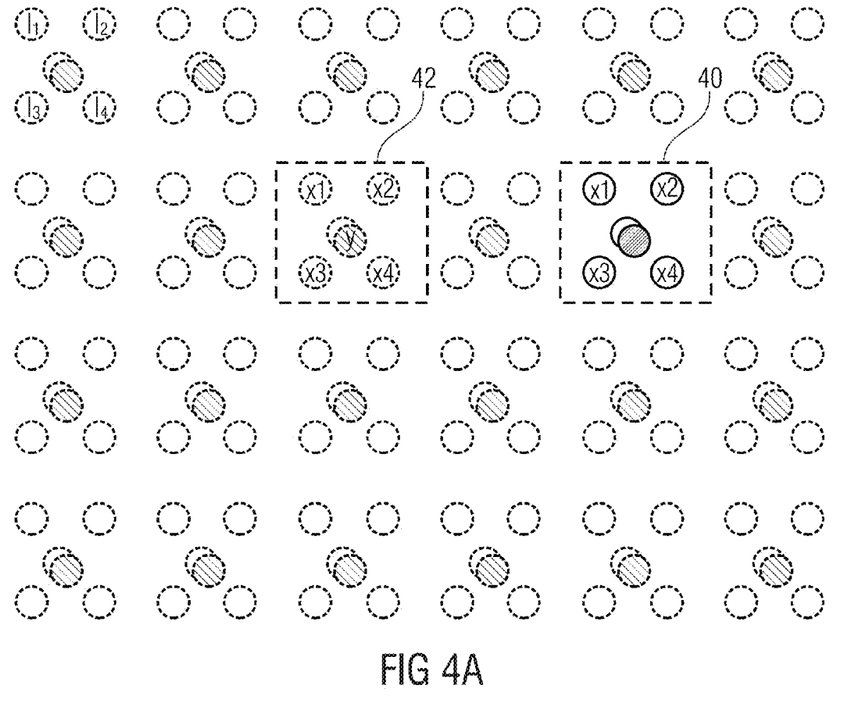
FIG. 4a-4b illustrate possible operations of the first and second subsamplers using filter kernels and the positioning of the filter kernels with respect to the detection areas of FIGS. 3a and 3b, respectively, one time for chroma subsampling down to the color sample pattern of FIG. 1c in case of FIG. 3a and the other time for the chroma subsampling down to the color sample pattern of FIG. 1b in case of FIG. 3b.
Figure 4B:
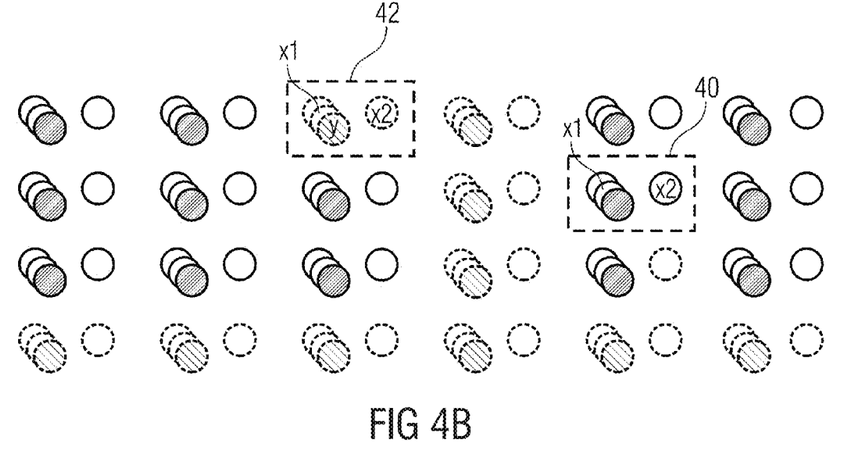

With respect to FIGS. 4a and 4b, an example is described where the first and second chroma subsamplers 14 and 16 are configured to perform chroma subsamplings of the image 18 using filter kernels positioned in a coinciding manner with respect to positions at which detector 12 performs the detection, i.e. positions at which detector 12 positions or distributes its local template. In accordance with FIGS. 4a and 4b, the first and the second chroma subsamplers 14 and 16 even use the same size of filter kernel compared to the local template used by detector 12 although, as described above, the local template used by the detector could also be larger. It should be noted that the description provided with respect to FIGS. 4a and 4b could also be varied so as to apply with respect to one of chroma subsamplers 14 and 16 only, for example.

However, in accordance with the embodiments of FIGS. 4a and 4b, the chroma subsamplers 14 and 16 are configured to operate as follows. In particular, for each of the 2×2 areas in the case of FIG. 4a and 2×1 areas in the case of FIG. 4b, for which the detector 12 has determined that the contrast is low in accordance with FIGS. 3a and 3b, for example, the chroma subsampler 16 performs the chroma subsampling by averaging the chroma sample values within that area. FIGS. 4a and 4b show, for example, the chroma subsampler's 16 filter kernel 40 illustratively as coinciding with the borders of one of the areas for which detector 12 has determined that the contrast is low, i.e. an area belonging to region 22. For this area, chroma subsampler 16 uses the chroma sample values within that kernel 40, here denoted as x1, x2, x3 and x4 in the case of FIG. 4a, and x1 and x2 in the case of FIG. 4b, averages same in accordance with a predetermined manner, and uses the averaging result as the chroma sample value y of the respective chroma channel of the final image 28 of the chroma sample locally positioned within filter kernel 40. The chroma subsampler 16 performs this averaging, for example, for each chroma channel separately.

FIGS. 4a and 4b, however, also show the chroma subsampler's 14 filter kernel 42, here exemplarily coinciding with the outline of an area for which detector 12 has exemplarily determined that this area is a high contrast area. Chroma subsampler 14 may, for example, set for each chroma channel the value of the chroma sample of the final chroma subsampled image 28 within kernel 42, equal to that chroma sample value among chroma sample values x1 to x4 in case of FIG. 4a, or x1 and x2 in case of FIG. 4b, within kernel 42, which is co-located to the maximum luminance value within kernel 42. For example, let $l_1$ denote the luminance value of image 18, which is co-located to chroma sample value x1 of image 18, $l_2$ the luma sample value co-located to the chroma sample value x2 and so forth. Then, subsampler 14 would set y to be $x_i$ with i being $$\arg(\max_j(l_j)).$$

However, it should be noted that even this example is merely for illustrative purposes. Instead of using the chroma sample value being co-located to the maximum luminance sample value of image 18, subsampler 14 could, for example, said y to be equal to the chroma sample value being co-located to the median of the luminance sample values within filter kernel 42, for example.

Figure 5A:
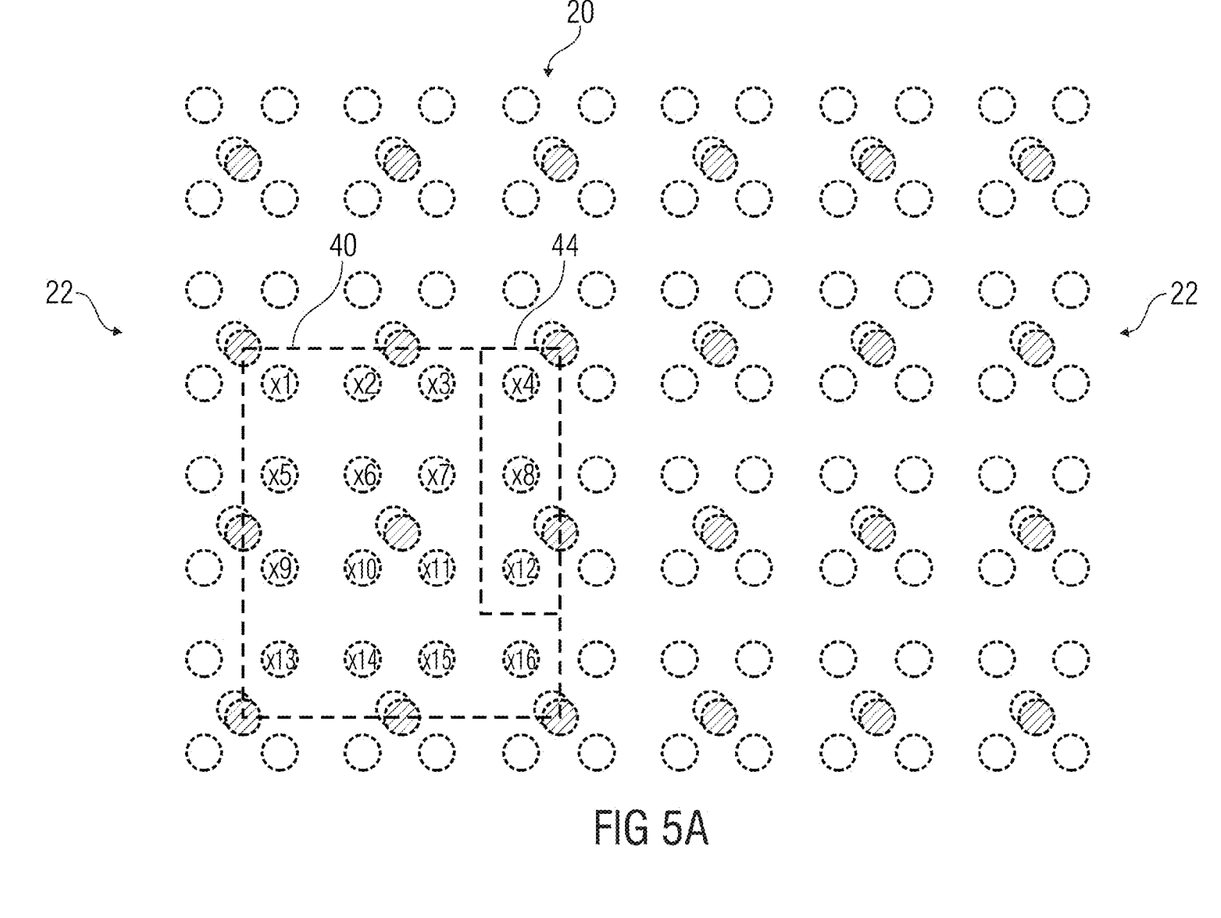
FIG. 5a-5b illustrate an alternative mode of operation of the second chroma subsampler using a filter kernel size which exceeds the positional areas at which high contrast detection is performed in accordance with FIGS. 3a and 3b, respectively, one time for chroma subsampling down to the color sample pattern of FIG. 1c in case of FIG. 3a and the other time for the chroma subsampling down to the color sample pattern of FIG. 1b in case of FIG. 3b.
Figure 5B:
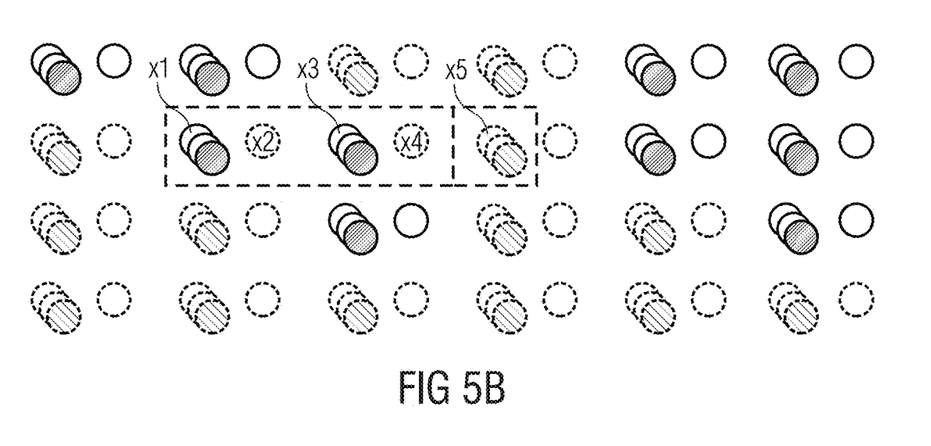

In order to illustrate further variations, FIGS. 5a and 5b illustrate that the chroma subsampler's 16 filter kernel 40 could, for example, exceed the size of positional areas at which detector 12 performs the high contrast detection, i.e. greater than 2×2 sample positions of image 18 in case of FIG. 5a and greater than 2×1 sample areas in image 18 in the case of FIG. 5b. In that case, the second chroma subsampler 16 could be configured to perform the chroma subsampling 26 of the image 18 with substituting chroma values within a portion 44 of this filter kernel 40 which, by accident, extends into the high contrast region 20 by appropriate values such as, for example, by use of extrapolation or by setting the chroma sample values within that portion 44 to a predetermined chroma value such as 0. For example, the chroma sample values of image 18 within filter kernel 40, currently positioned so as to overlap region 20, are, in the case of FIG. 5a, chroma sample values x4, x8 and x12 and in case of FIG. 5b, x5, and chroma subsampler 16 could, for example, extrapolate these chroma sample values from the other chroma sample values within filter kernel 40, i.e. all other among x1 to x16 in the case of FIG. 4a, or from x1 to x4 in the case of FIG. 5b, or may set these values to a predetermined value such as 0. Then, subsampler 16 could proceed with the usual filter processing such as averaging over x1 to x16 in the case of FIG. 5a and over x1 to x5 in the case of FIG. 5b.

Summarizing the above embodiments, same used two different chroma subsampling methods with one being selected to avoid color bleeding artifacts and the other one being selected to avoid de-saturation artifacts. The color bleeding avoiding chroma subsampling method may, for example, use the chrominance values from pixel positions with highest luminance value in the 2×2 or 2×1 pixel areas as described above. A selection among the chroma subsampling methods may, as described above, be performed on the basis of the ratio of highest to lowest luminance value in 2×2 or 2×1 pixel areas. The pixel areas used in the chroma subsampling methods, and used in chroma subsampling method selection may coincide as described above. The ratio of the luminance values may be computed as a difference in case of using a logarithm domain to represent the luminance in image 18. In particular, the above described embodiments may be used to chroma subsample HDR images or video.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] WO2011088960
[2] Gary Sullivan: "Color forma down-conversion for test sequence generation", ISO/IEC JTC1/SC29/WG11 MPEG2003/N6265, December 2003, Waikoloa
[3] Gary Sullivan: "Color format up-conversion for video display" ISO/IEC JTC1/SC29/WG11 MPEG2003/N6296, December 2003, Waikoloa

The invention claimed is:

1. An apparatus for chroma subsampling, comprising:
a detector configured to detect high contrast areas in a luminance channel of an image to be chroma subsampled so as to partition the image into a first region composed of the high contrast areas and a second region distinct from the first region;
a first chroma subsampler configured to chroma subsample the image in the first region;
a second chroma subsampler configured to chroma subsample the image in the second region,
wherein the first chroma subsampler exhibits a higher edge preserving property than compared to the second chroma subsampler.

2. The apparatus according to claim 1, wherein the detector is configured to detect the high contrast areas by locally checking whether a ratio between lowest and highest luminance within a first local template exceeds a predetermined threshold.

3. The apparatus according to claim 2, wherein the luminance channel of the image to be chroma subsampled represents the luminance on a logarithmic scale and the detector is configured to determine the ratio between lowest and highest luminance within the local template by subtraction.

4. The apparatus according to claim 2, wherein the detector is configured to, in detecting the high contrast areas, gap-lessly, and without overlap, distribute the local template over the image, thereby defining a template grid, wherein the first and second chroma subsamplers are configured to perform the chroma subsampling of the image such that the chroma subsampling results in a subsampling resolution coinciding with a resolution of the template grid.

5. The apparatus according to claim 1, wherein the first chroma subsampler is configured to perform the chroma subsampling of the image using a first filter kernel positioned coinciding with the position at which the detector performs the detection.

6. The apparatus according to claim 4, wherein the second chroma subsampler is configured to perform the chroma subsampling of the image using a second filter kernel positioned coinciding with the position at which the detector performs the detection.

7. The apparatus according to claim 1, wherein the first chroma subsampler is configured to perform the chroma subsampling using a rank filter.

8. The apparatus according to claim 1, wherein the first chroma subsampler is configured to kernel-wise select a chroma sample value of the image to be chroma subsampled, being co-located to a maximum or minimum luminance sample value of the image to be chroma subsampled.

9. The apparatus according to claim 1, wherein the second chroma subsampler is configured to perform the chroma subsampling using an average filter.

10. The apparatus according to claim 1, wherein the second chroma subsampler is configured to perform the chroma subsampling of the image using a second filter kernel and substitute a portion of a the second filter kernel extending into the first region using extrapolation and by setting same to a predetermined chroma value.

11. A method for chroma subsampling, comprising:
    detecting high contrast areas in a luminance channel of a image to be chroma subsampled so as to partition the image into a first region composed of the high contrast areas and a second region distinct from the first region;
    chroma subsample the image in the first region using a first chroma subsampler;
    chroma subsample the image in the second region a second chroma subsampler,
    wherein the first chroma subsampler exhibits a higher edge preserving property than compared to the second chroma subsampler.

12. A computer program comprising a program code for performing, when running on a computer, a method according to claim 11.

* * * * *